United States Patent
Wu et al.

(10) Patent No.: US 8,610,826 B2
(45) Date of Patent: Dec. 17, 2013

(54) METHOD AND APPARATUS FOR INTEGRATED MOTION COMPENSATED NOISE REDUCTION AND FRAME RATE CONVERSION

(75) Inventors: Dongsheng Wu, Hainesport, NJ (US); Larry Pearlstein, Newtown, PA (US)

(73) Assignee: Broadcom Corporation, Irvine, AZ (US)

( * ) Notice: Subject to any disclaimer, the term of this patent is extended or adjusted under 35 U.S.C. 154(b) by 427 days.

(21) Appl. No.: 12/549,127

(22) Filed: Aug. 27, 2009

(65) Prior Publication Data

US 2011/0051005 A1     Mar. 3, 2011

(51) Int. Cl.
*H04N 7/01* (2006.01)
*H04N 11/20* (2006.01)
*H04N 5/00* (2011.01)

(52) U.S. Cl.
USPC ........................... 348/459; 348/620; 348/452

(58) Field of Classification Search
USPC ......................................... 348/448–459, 620
See application file for complete search history.

(56) References Cited

U.S. PATENT DOCUMENTS

| | | | |
|---|---|---|---|
| 4,352,126 A * | 9/1982 | Poncin et al. | 348/620 |
| 5,546,130 A * | 8/1996 | Hackett et al. | 348/447 |
| 7,705,918 B2 * | 4/2010 | Yamauchi | 348/607 |
| 2006/0232712 A1 * | 10/2006 | Zhou et al. | 348/701 |

* cited by examiner

*Primary Examiner* — Michael Lee
(74) *Attorney, Agent, or Firm* — Thomas | Horstemeyer, LLP

(57) ABSTRACT

A video processing system may receive a current raw video frame and may estimate motion between the current frame and a previous frame to determine motion vectors (mv). Based on the same mvs, motion compensated (MC) noise reduction may be performed and MC frame rate conversion (FRC) may generate a new frame. The previous frame may be noise reduced and/or a raw video frame. A MC frame may be generated based on the previous video frame and the mvs. Noise reduction may comprise blending the current raw frame with the MC frame. A blending factor may be determined based on similarity between pixels of the current video frame and MC pixels of the previous frame. The mvs may be scaled for FRC. Noise reduction may be performed in parallel and/or prior to the FRC depending on whether raw or noise reduced frames are utilized.

20 Claims, 6 Drawing Sheets

METHOD AND APPARATUS FOR INTEGRATED MOTION COMPENSATED NOISE REDUCTION AND FRAME RATE CONVERSION

CROSS-REFERENCE TO RELATED APPLICATIONS/INCORPORATION BY REFERENCE

Not applicable

FIELD OF THE INVENTION

Certain embodiments of the invention relate to video processing. More specifically, certain embodiments of the invention relate to integrated motion compensated noise reduction and frame rate conversion.

BACKGROUND OF THE INVENTION

In digital video processing, noise may occur that creates incorrect pixels to exist within a frame image. Not only is this noise capable of distorting the image and affecting the visibility of the image, it also creates issues with regard to processing of the image. For example, more complex processing requirements may be created and the compressibility of the image may be affected due to the extraneous elements that must be accounted for. Motion compensated noise reduction (MCNR) is a temporal noise reduction technology that reduces noise without sacrificing details of content in the frame that is in motion.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for integrated motion compensated noise reduction and frame rate conversion, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for integrated motion compensated noise reduction and frame rate conversion. In various embodiments of the invention, a video processing system may be operable to receive a current raw video frame and estimate motion between the current raw video frame and a previous video frame to determine motion vectors. Noise reduction may be performed on the current raw video frame based on the determined motion vectors. Furthermore, frame rate conversion that may generate one or more inserted video frames between the current noise reduced video frame and the previous video frame may be determined based on the determined motion vectors. The previous video frame may be noise reduced and/or may be a raw video frame for performing the noise reduction.

A motion compensated video frame may be generated based on the previous video frame and the determined motion vectors. A current noise reduced video frame may be produced by blending the current raw video frame with the motion compensated video frame. A blending factor for the blending may be determined based on a level of similarity between pixels of the current raw video frame and motion compensated pixels of the previous video frame. The motion vectors may be scaled for performing the frame rate conversion, for example, scaled based on a temporal distance between the current noise reduced video frame and the one or more inserted video frames.

In an exemplary embodiment of the invention, the noise reduction on the current raw video frame may be performed in parallel with the frame rate conversion in instances when one or more inserted video frames are generated based on the current raw video frame and the raw previous video frame. In another exemplary embodiment of the invention, the noise reduction on the current raw video frame may be performed in parallel with the frame rate conversion in instances when one or more inserted video frames are generated based on the current raw video frame and a noise reduced the previous video frame. Furthermore, the noise reduction on the current raw video frame may be performed prior to performing frame rate conversion that may generate one or more inserted video frames based on the current noise reduced video frame and a noise reduced the previous video frame.

Figure 1:
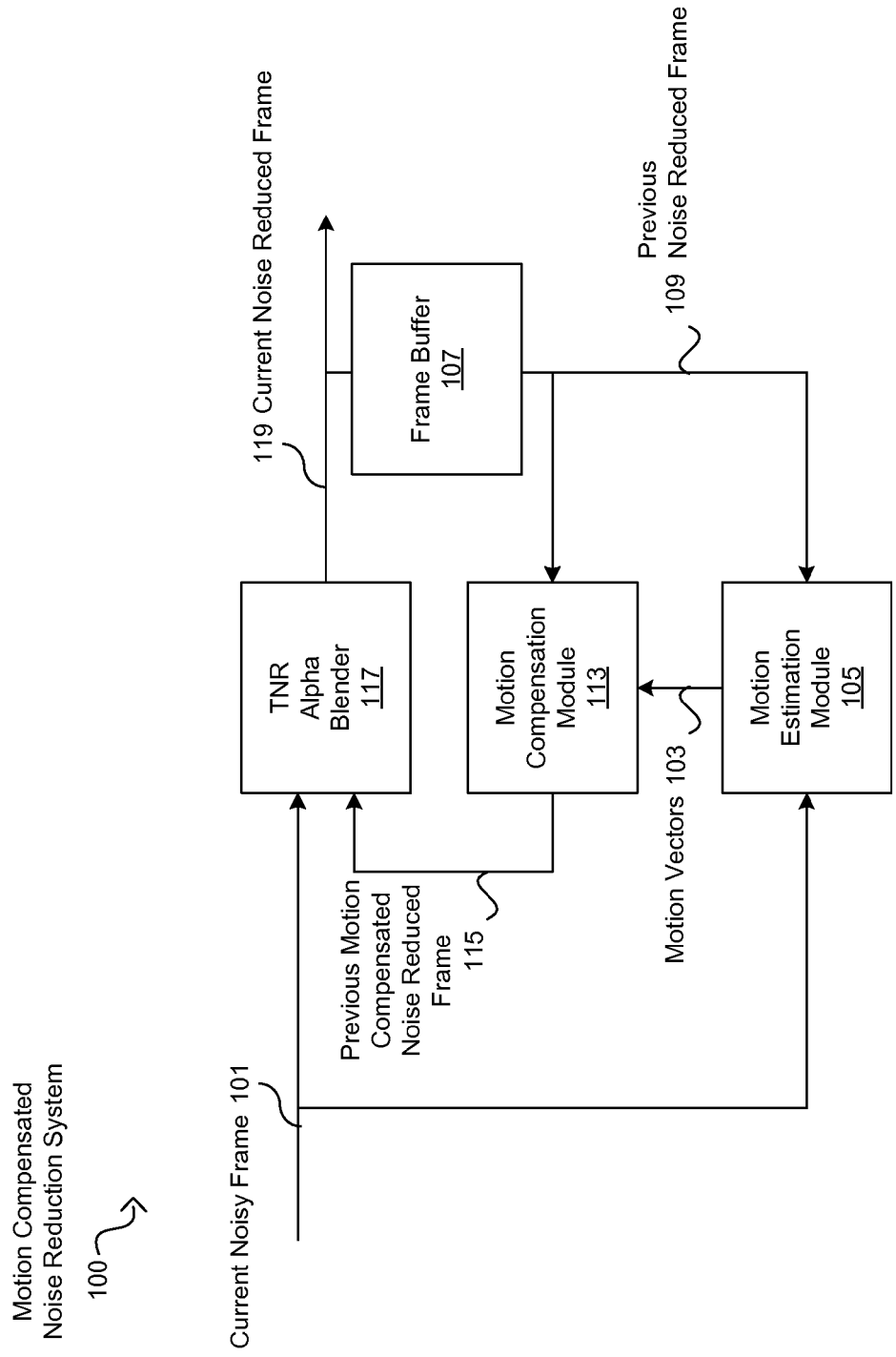
FIG. 1 is a block diagram illustrating an exemplary motion compensated noise reduction system, which may be utilized in connection with an embodiment of the invention.

FIG. 1 is a block diagram illustrating an exemplary motion compensated noise reduction system, which may be utilized in connection with an embodiment of the invention. Referring to FIG. 1 there is shown, a motion compensated noise reduction (MC-NR) system 100 comprising a temporal noise reduction (TNR) alpha blender 117, a motion estimation (ME) module 105, a motion compensation (MC) module 113 and a frame buffer 107. In addition, there is shown, a current noisy frame 101, a previous noise reduced (NR) frame 109 a previous motion compensated noise reduced (MC-NR) frame 115, motion vectors 103 and a current noise reduced (NR) frame 119. The architecture of the MC-NR system 100 comprises a temporal infinite impulse response (IIR) filter where the frame buffer 107 provides feedback comprising the previous NR frame 109.

In various embodiments of the invention, the MC-NR system 100 may be part of a set-top-box or tuner, a television, a digital camera, a DVD player and/or a gaming system, for example. The MC-NR system 100 may be operable to handle interlaced video fields and/or progressive video frames. For example, the MC-NR system 100 may be operable to utilize motion compensation techniques to reduce noise in interlaced video and/or progressive video. Video fields, for example, interlaced fields and/or progressive video frames may be referred to as fields, video fields, frames and/or video frames.

The temporal noise reduction (TNR) alpha blender 117 may comprise suitable logic, circuitry, interfaces and/or code that may be operable to receive the current noisy frame 101 and the previous MC-NR frame 115 and may determine a current NR output 119 based on IIR filtering. The TNR alpha blender 117 may utilize a blending factor alpha for the IIR filtering. The current NR output 119 may be stored in the frame buffer 107 and/or may be sent to, for example, a display device.

The motion estimation (ME) module 105 may comprise suitable logic, circuitry, interfaces and/or code that may be operable to receive the current noisy frame 101 and the previous NR frame 109 and may determine the motion vectors 103 for one or more specified pixels of the current noisy frame 101. In this regard, the ME module 105 may search for one or more pixels and/or pixel structures within the previous NR frame 109 that may match or be similar to one or more specified pixels and/or pixel structures within the current noisy frame 101. The motion vectors 103 may be determined based upon a displacement of the matching and/or similar pixels and/or pixel structures in the previous NR frame 109 relative to the location of the one or more specified pixels and/or pixel structures in the current noisy frame 101.

The motion compensation (MC) module 113 may comprise suitable logic, circuitry, interfaces and/or code that may be operable to receive the motion vectors 103 and the previous NR frame 109 and output the previous MC-NR frame 115 to the TNR alpha blender 117. In this regard, the MC module 113 may utilize the motion vectors 103 to identify the location of pixels and/or pixel structures in the previous NR frame 109 that have moved to a different position in the current noisy frame 101.

The frame buffer 107 may comprise suitable logic, circuitry, interfaces and/or code that may be operable to store the current NR frame 119 and/or one or more previous NR frames 109 during processing of one or more noisy frames. The frame buffer 107 may receive the current NR frame 119 from the TNR alpha blender 117 and may output the previous NR frame 109 to the MC module 113 and/or the ME module 105.

In operation, the current noisy frame 101 may be directed to the temporal noise reduction (TNR) alpha blender 117 and to the motion estimation (ME) module 105. The previous NR frame 109 may be sent from the frame buffer 107 to the ME module 105. The ME module 105 may compare the current noisy frame 101 with the previous NR frame 109. In this regard, one or more pixels from the current noisy frame 101 may be compared with one or more pixels from the previous NR frame 109 to estimate motion within the frames. The results of the comparisons may be stored as motion vectors 103. The motion vectors 103 and the previous NR frame 109 may be sent to the MC module 113. The motion vectors 103 may be applied to the previous NR frame 109 which may result in the previous MC-NR frame 115. The previous MC-NR frame 115 and the current noisy frame 101 may be input to the TNR alpha blender 117 where the two frames may be blended to arrive at the current NR frame 119. In instances when the previous MC-NR frame 115 is detected as unreliable for a certain area, the TNR alpha blender 117 may fall back to motion adaptive noise reduction by directly using the previous NR frame 109 instead of the previous MC-NR frame 115. The current NR frame 119 may be output from the MC-NR system 100 and/or may be stored in the frame buffer 107. The NR frame 109 stored in the frame buffer 107 may then be used as the previous NR frame 109 when the next noisy frame 101 is received.

Figure 2:
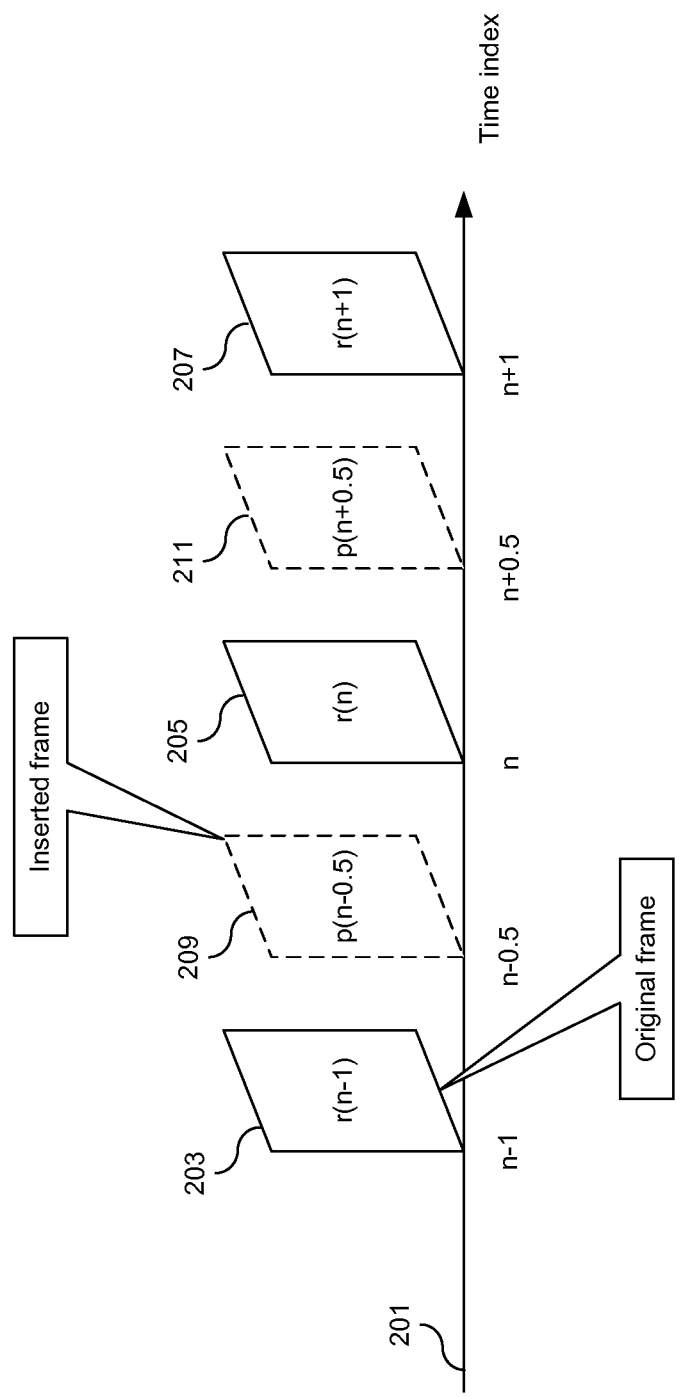
FIG. 2 is a block diagram illustrating an exemplary method of frame rate conversion, which may be utilized in connection with an embodiment of the invention.

FIG. 2 is a block diagram illustrating an exemplary method of frame rate conversion, which may be utilized in connection with an embodiment of the invention. Referring to FIG. 2, there is shown, three reference frames r(n−1) 203, r(n) 205 and r(n+1) 207 and two inserted frames p(n−0.5) 209 and p(n+0.5) 211 positioned over a time line 201.

The three reference frames r(n−1) 203, r(n) 205 and r(n+1) 207 may be part of a received and/or generated original video sequence. In an exemplary embodiment of the invention, the original video sequence may be captured or generated at a frame rate of 60 Hz. The original video sequence may be up-converted to enable a higher frame refresh rate of 120 Hz, for example, by inserting the two frames p(n−0.5) 209 and p(n+0.5) 211 within the original video sequence. In this regard, when performing frame rate up conversion, the reference frames r(n−1) 203, r(n) 205 and r(n+1) 207 in the original video sequence may be analyzed and/or may be duplicated to generate new frames. Accordingly, the new frames may be inserted into the original video sequence. Alternatively, new frames may be generated by analyzing one or more of the reference frames r(n−1) 203, r(n) 205 and r(n+1) 207, for example, analyzing changing pixels due to relative motion of objects in the frames and/or by making assumptions about specific areas of the frames. In this manner, the inserted frames p(n−0.5) 209 and p(n+0.5) 211 may be determined and may be inserted in the original video sequence based on motion compensated computations that may involve consecutive reference frames. For example, the inserted interpolated frame 209 may be determined based upon motion vectors computed for motion between reference frames r(n−1) 203 and r(n) 205. Furthermore, any suitable temporal and/or spatial techniques and/or one or more fallback mechanisms may be utilized for determining the inserted frames p(n−0.5) 209 and/or p(n+0.5) 211. For example, alternate techniques may be utilized in instances of incorrect motion vector values. In instances when frame rate up conversion may more than double an original frame rate, more than one new frame may be inserted between two reference frames.

Figure 3:
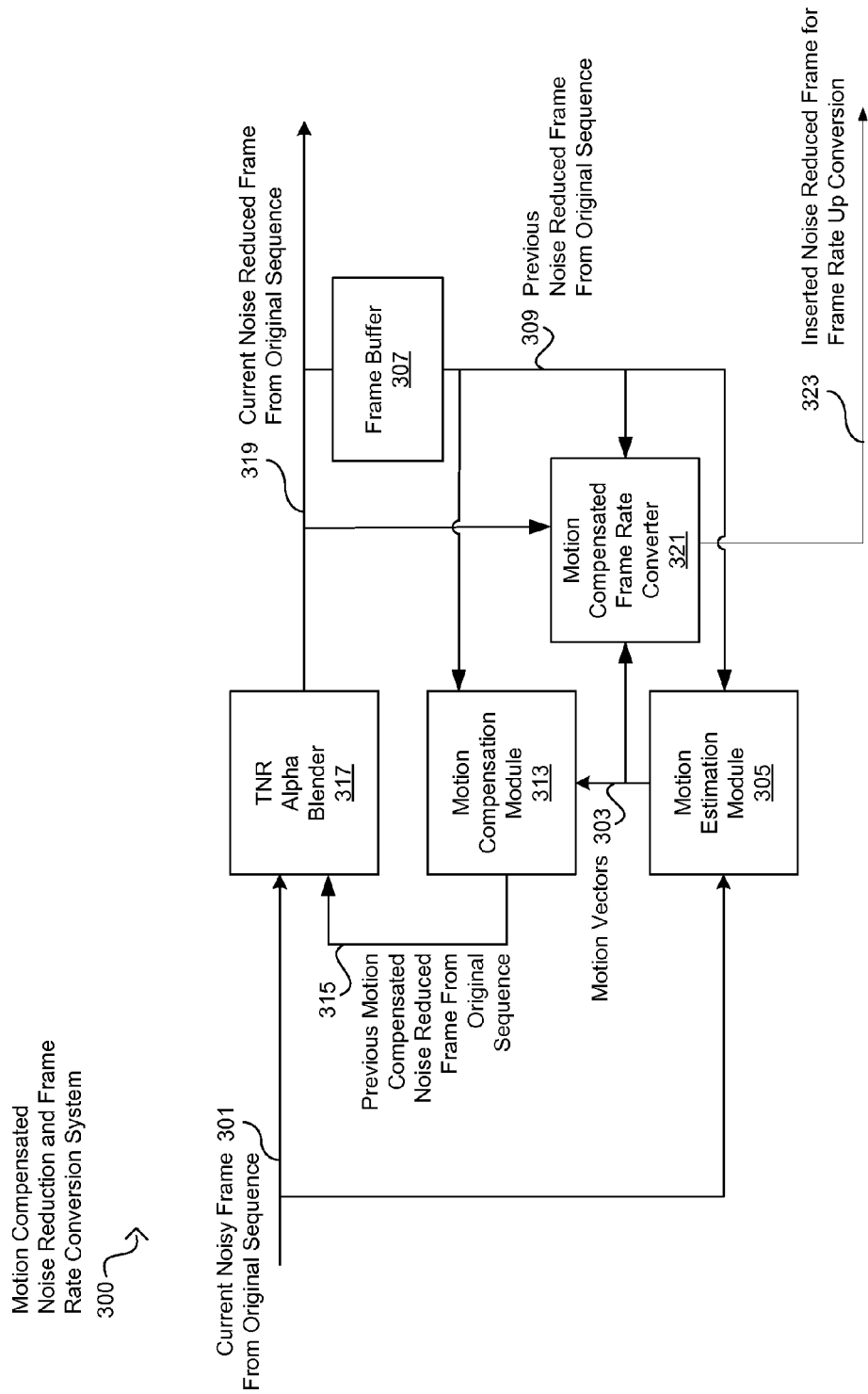
FIG. 3 is a block diagram illustrating an exemplary integrated motion compensated noise reduction and motion compensated frame rate conversion system based on IIR filtering techniques, in accordance with an embodiment of the invention.

FIG. 3 is a block diagram illustrating an exemplary integrated motion compensated noise reduction and motion compensated frame rate conversion system based on IIR filtering techniques, in accordance with an embodiment of the invention. Referring to FIG. 3, there is shown, a motion compensated noise reduction and motion compensated frame rate conversion (MC-NR and MC-FRC) system 300 comprising a temporal noise reduction (TNR) alpha blender 317, a motion estimation (ME) module 305, a motion compensation (MC) module 313, frame buffer 307 and a motion compensated frame rate converter (MC-FRC) 321. In addition, there is shown, a current noisy frame from an original sequence 301, a previous noise reduced frame from an original sequence (P-NR-O frame) 309, a previous motion compensated noise reduced frame from an original video sequence (P-MC-NR-O frame) 315, motion vectors 303, a current noise reduced frame from an original sequence (C-NR-O frame) 319 and a current noise reduced inserted frame (C-NR-I frame) 323.

The TNR alpha blender 317, the ME module 305, the MC module 313 and the frame buffer 307 may be similar and/or substantially the same as the TNR alpha blender 117, the motion estimation ME module 105, the MC module 113 and the frame buffer 107 respectively, described with respect to FIG. 1 and FIG. 2, for example. Furthermore, the current noisy frame from an original sequence 301, the P-NR-O frame 309, the P-MC-NR-O frame 315, the motion vectors 303, the C-NR-O frame 319 may be similar and/or substantially the same as the current noisy frame 101, the previous NR frame 109, the previous MC-NR frame 115, the motion vectors 103 and the current NR frame 119 respectively, for example.

The motion compensated frame rate converter (MC-FRC) 321 may comprise suitable logic, circuitry, interfaces and/or code that may be operable to utilize motion vectors and pixel data from one or more frames of an original sequence to determine one or more inserted frames. For example, the MC-FRC 321 may be operable to interpolate the inserted frame p(n−0.5) 209 based on the methods described with respect to FIG. 2. The motion compensated frame rate converter (MC-FRC) 321 may be operable to receive inputs from the TNR alpha blender 317, the ME module 305 and the frame buffer 307. Based on the received inputs, the motion compensated frame rate converter (MC-FRC) 321 may be operable to generate an interpolated frame to be inserted between the current noise reduced frame from the original sequence and the previous noise reduced frame from the original sequence.

In operation, the motion compensated noise reduction and motion compensated frame rate conversion (MC-NR and MC-FRC) system 300 may be operable to perform digital video processing where motion estimation information may be shared by noise reduction modules and frame rate conversion modules. In this regard, the current noisy frame 301 may be received by the TNR alpha blender 317 and the motion estimation module 305. The ME module 305 may also receive the previous noise reduced frame from an original sequence (P-NR-O frame) 309 from the frame buffer 307. The motion estimation module 305 may analyze the current noisy frame 301 and/or the P-NR-O frame 309 to determine differences of pixel data that may indicate motion and/or may determine how much motion occurs between the frames. These differences may be calculated and may enable determination of the motion vectors 303. A process for determining motion vectors 303 may be complex and may require a great deal of computation. The computation and/or generation of the motion vectors 303 may be performed by the ME module 305. The motion vectors 303 may be communicated to the MC module 313 and to the motion compensated frame rate converter (MC-FRC) 321. In this manner, the motion vectors 303 may be calculated once and may be utilized for both noise reduction and frame rate conversion rather than calculating the motion vectors multiple times.

The MC module 313 may be operable to generate the P-MC-NR-O frame 315 which may be communicated to the TNR alpha blender 317. The TNR alpha blender 317 may blend the current noisy frame 301 with the P-MC-NR-O frame 315 to create the current noise reduced from an original sequence (C-NR-O) frame 319. The C-NR-O frame 319 may also be stored in the frame buffer 307 for use by the ME module 305 to determine motion vectors for the next current frame. Furthermore, the MC-FRC 321 may be operable to receive the motion vectors, C-NR-O frame 319 and/or the P-NR-O frame 109 and may generate an interpolated frame to be inserted between the C-NR-O frame 319 and the P-NR-O frame 109 in an output sequence. In this regard, the MC-FRC 321 may scale the motion vectors, for example, in proportion to the time difference between the C-NR-O frame 319 and an inserted frame.

In various embodiments of the invention, the current noisy frame 301 from the original sequence may be utilized in place of the C-NR-O frame 319 to interpolate the inserted frame, however, the results may comprise more noise that may need to be reduced. The MC-FRC 321 may be operable to generate a plurality of new frames to be inserted between consecutive frames of the original sequence. In this regard, the MC-FRC 321 may generate a plurality of motion compensated frames between consecutive original frames. In other exemplary embodiments of the invention, the current noisy frame 301 from the original sequence may be utilized in place of the C-NR-O frame 319 to interpolate the inserted frame, however, the resulting interpolated frames may comprise more noise that may need to be reduced.

Figure 4:
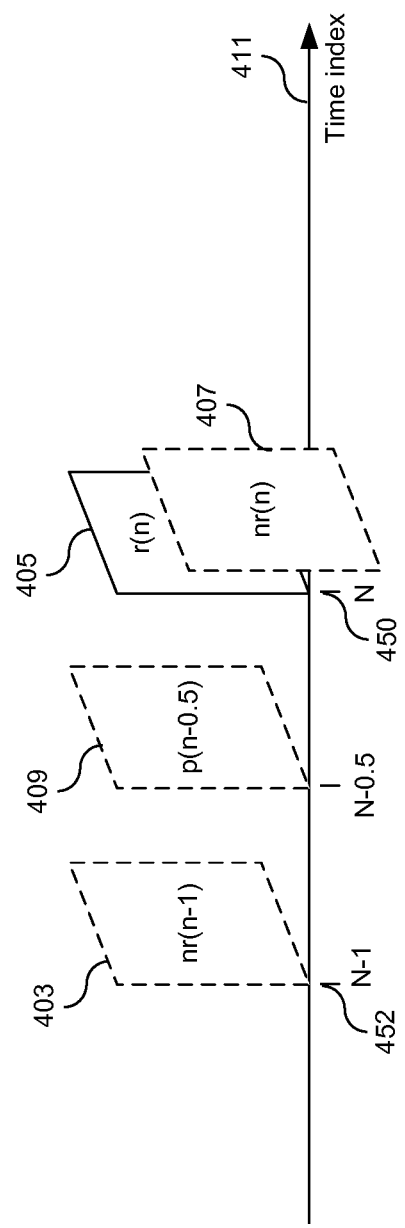
FIG. 4 is a block diagram illustrating an exemplary method of integrated motion compensated noise reduction and motion compensated frame rate conversion based on IIR filtering techniques, in accordance with an embodiment of the invention.

FIG. 4 is a block diagram illustrating an exemplary method of integrated motion compensated noise reduction and motion compensated frame rate conversion based on IIR filtering techniques, in accordance with an embodiment of the invention. Referring to FIG. 4, there is shown, a current noise reduced frame nr(n) 407, a current noisy reference frame r(n) 405, a previous noise reduced frame nr(n−1) 403 and a new inserted frame p(n−0.5) 409. In addition, there is shown a time index line 411 and time indices N 450 and N−1 452.

The current noise reduced frame nr(n) 407 may be generated based on the current noisy reference frame r(n) 405 and the previous noise reduced frame nr(n−1) 403.

The current noisy reference frame r(n) 405 may be similar or substantially the same as the current noisy frame from an original sequence 301 and/or as the reference frame r(n) 205 described with respect to FIG. 2, for example. The current noisy reference frame r(n) 405 may be referred to as the raw frame 405 and/or the current noisy frame 405.

The noise reduced reference frames nr(n−1) 403 and nr(n) 407 may be similar and/or substantially the same as the previous noise reduced frame from the original sequence 309 and the current noise reduced frame from the original sequence 319 respectively, that are described with respect to FIG. 3, for example. The new inserted frame p(n−0.5) 409 may be a new frame generated by the MC-FRC 321 based on noise reduced reference frames nr(n−1) 403 and nr(n) 407.

A motion vector v(n) may be calculated based on pixel data from the raw frame 405 that may correspond to the time index N 450 and pixel data from the previous noise reduced frame 403 that may correspond to the time index N−1 452 according to the following equation:

$$v(n)=V(nr(n-1),r(n)) \hspace{2cm} \text{Equation 1.}$$

Referring to the equation 1, nr(n−1) may indicate the noise reduced frame 403 at time index N−1 452; r(n) may indicate the raw frame 405 at time n 450; the mapping function V(.,.) may indicate motion vector computation; and v(n) may be the result which, for each pixel, comprises the value of movements in the horizontal and vertical directions that a current pixel in the current noisy frame 405 is moved from a corresponding pixel in the previous noise reduced frame nr(n−1) 403. Various approaches such as block-matching may be used to compute the motion vector v(n). Using this approach, for a given pixel, a block surrounding the pixel in the current noisy frame 405 may be compared with a neighborhood of pixels in the previous noise reduced frame nr(n−1) 403 for similarity using criteria of sum of absolute difference (SAD). A result comprising a minimum SAD value may be selected as the motion vector for the given pixel.

The noise reduced previous frame, denoted by nr(n−1) 403 represents the frame from time index N−1 452. The raw frame, denoted by r(n) 405 is the raw frame from time index N 450. A motion compensated frame to be used for noise reduction, not shown, is denoted by mc(n) for time index N 450 and may be calculated using the motion vectors of Equation 1 according to Equation 2:

$$mc(n)=M(nr(n-1),v(n)) \qquad \text{Equation 2.}$$

The motion compensated frame mc(n) is calculated as represented by function M, using the previous noise reduced frame 403, denoted by nr(n−1), and the motion vector v(n) calculated in Equation 1.

In the Equation 2, nr(n−1) indicates the noise reduced frame at time n−1; v(n) indicates the motion vector computed from the previous stage; the mapping function M(.,.) indicates the motion compensation computation; and mc(n) is a result which, for each pixel, includes the motion compensated pixels. The mapping function M(.,.) uses two matrix parameters including the previous noise reduced frame and the motion vectors. For each pixel in mc(n), the pixel value may be determined by pixels in the previous noise reduced frame nr(n−1) and their movements based on the motion vectors. In this regard, pixels in the previous noise reduced frame nr(n−1) are moved to new locations based on the computed motion vectors v(n). Accordingly, the motion compensated frame may bear the best similarity of the current noisy frame r(n) 405 but with noise reduction since the motion compensated frame mc(n) may be based on the previous noise reduced frame nr(n−1). Spatial interpolation may be utilized in instances when a moving distance is in a fraction of pixels.

A noise reduced frame nr(n) 407 at time index N 450 may be computed according to:

$$nr(n)=A(r(n),mc(n)) \qquad \text{Equation 3.}$$

The noise reduced frame nr(n) 407 at the time index N 450 may be calculated using the blending function A(.,.) based on the raw frame 405 at time index N 450 and the motion compensated frame mc(n) at time index N 450 calculated in Equation 2.

In the Equation 3, r(n) indicates the raw frame 405 at time index N. mc(n) represents the motion compensated frame; the blending function A(.,.) may blend them to form the output frame nr(n). In various embodiments of the invention, for each pixel, nr(n)=α*r(n)+(1−α)*mc(n) where α is a blending coefficient which may vary on a pixel basis. The blending coefficient is a function of pixel similarity (or motion). For example, when r(n) is similar to mc(n) (a no motion case), a smaller α<<1 may be used which may result in filtering the noisy current frame. In instances when r(n) is different from mc(n) (a motion case), a larger α→1 should be used which results in less filtering of r(n). Neighboring pixels may be utilized for measuring the "similarity" between r(n) and mc(n).

The interpolated frame p(n−0.5) 409 may be inserted between the previous noise reduced frame nr(n−1) 403 and the current noise reduced frame nr(n) 407 to perform frame rate conversion. In an exemplary embodiment of the invention, in instances where p(n−0.5) 409 may be placed halfway between the time indices N and N−1, a motion vector of 0.5*v(n) may be utilized to determine a motion compensated frame for frame rate conversion by MC-FRC 321, for example. In this manner, the highly computationally complex motion vector calculations shown in the Equation 1 may only be performed once and may be used for both the interpolation of frames during motion compensated frame rate conversion and for motion compensated noise reduction. Furthermore, the exemplary recursive structure shown in FIG. 3 may constitute a temporal IIR filter that may be capable of achieving more than −3 dB noise attenuation.

Figure 5:
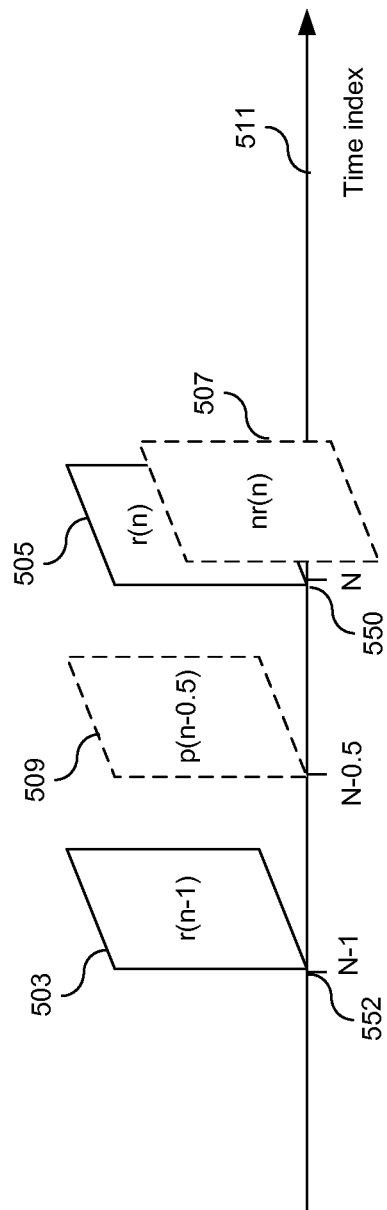
FIG. 5 is a block diagram illustrating an exemplary method of integrated motion compensated noise reduction and motion compensated frame rate conversion based on FIR filtering techniques, in accordance with an embodiment of the invention.

FIG. 5 is a block diagram illustrating an exemplary method of integrated motion compensated noise reduction and motion compensated frame rate conversion based on FIR filtering techniques, in accordance with an embodiment of the invention. Referring to FIG. 5, there is shown, a noise reduced current frame nr(n) 507, a current noisy reference frame r(n) 505, a previous noisy reference frame 503 and an new inserted frame p(n−0.5) 509. In addition, there is shown the time index line 511 and time indices N 550 and N−1 552.

The noise reduced current frame nr(n) 507 may be generated based on the current noisy reference frame r(n) 505 and a previous noisy reference frame 503.

The current noisy reference frame r(n) 505 may be similar and/or substantially the same as the current noisy frame r(n) 405. The previous noisy reference frame 503 may comprise a previous input to the TNR alpha blender 317 and/or to the ME module 305 that has not yet been noise reduced.

In an exemplary embodiment of the invention, motion vectors may be determined based on FIR filtering techniques that may not utilize noise reduced frame feedback. In this regard, the motion vectors may be determined based on raw current frames and/or raw previous frames. The current noisy reference frame r(n) 505 and/or the previous noisy reference frame r(n−1) 503 may be referred to as raw frames. The raw frame r(n) 505 that may be located at the time index N 550 and/or the raw frame r(n−1) 503 located at time index N−1 552 may be utilized to determine motion vectors v(n). The motion vectors v(n) may be calculated based on the equation:

$$v(n)=V(r(n-1),r(n)) \qquad \text{Equation 4.}$$

A motion compensated frame mc(n) that may be utilized for noise reduction may be computed utilizing the raw frame r(n−1) 503 and the motion vectors v(n) from Equation 4 according to:

$$mc(n)=M(r(n-1),v(n)) \qquad \text{Equation 5.}$$

The noise reduced frame, denoted by nr(n) 507 may be calculated according to:

$$nr(n)=A(r(n),mc(n)) \qquad \text{Equation 6.}$$

where A (.,.) is a blending function which may perform the temporal noise reduction and mc(n) is the motion compensated frame at time index N 550 calculated in Equation 5. In instances when no motion is detected between the raw frame r(n) 505 and the raw frame r(n−1) 503 a blending value may be utilized according to the following equation:

$$nr(n)=\alpha*r(n)+(1-\alpha)*mc(n) \qquad \text{Equation 7.}$$

In instances when motion is not detected and α=0.5, for example, a −3 dB noise attenuation may be achieved. Motion may be detected on a per pixel basis.

For the inserted frame p(n−0.5) 509, it may be that $$p(n-0.5)=P(r(n-1),r(n),0.5*v(n))$$

or $$p(n-0.5)=P(nr(n-1),r(n),0.5*v(n))$$

or $$p(n-0.5)=P(nr(n-1),nr(n),0.5*v(n)) \qquad \text{Equation 8.}$$

where the motion vector v(n) may be the same one as computed for the motion compensated noise reduction in Equation 1; the factor of 0.5 reflects that the inserted frame is half between the frame at time index N−1 and frame at time index N and therefore, the motion vector is reduced in half; the three parameter function P(., ., .) may utilize the frame at time index N−1 for the first parameter and the frame at time index N for the second parameter and the motion vector v(n) for the third parameter to generate the insertion frame. If the raw frames 503 and 505 are utilized, the inserted frames 509 may be generated in parallel with noise reduction which may have minimal impact on frame rate conversion. However, noise in the inserted frame may not be very well noise reduced because the raw frames are utilized. In instances when the noise reduced previous frame 403 at time index N−1 and the current raw frame N 405 are utilized for frame rate conversion, the inserted frame 409 may be partially noise reduced. In this regard, the noise reduction and the frame rate conversion frame may be computed in parallel using the noise reduced previous frame, current noisy frame, and the motion vector. In instances when the noise reduced previous frame 403 and the noise reduced current frame 407 are utilized for frame rate conversion, the inserted frame 409 may be fully noise reduced. In this regard, the input frames to the frame rate conversion are both noise reduced as shown in the serial architecture from TNR alpha blender 317 to the MC-FRC 321. The MC-FRC 321 computation may need to wait until the current noise reduced frame, nr(n) is generated.

Figure 6:
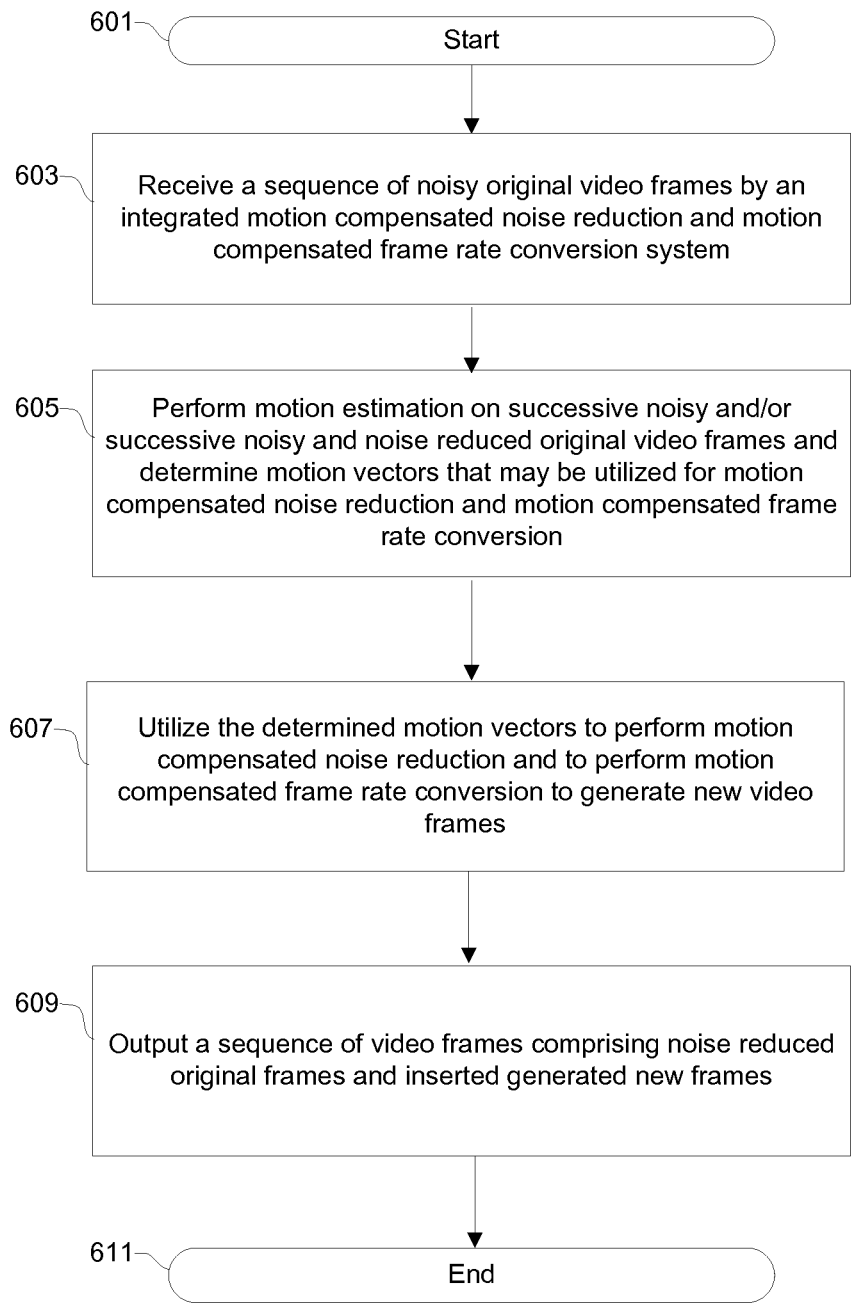
FIG. 6 is a flow chart illustrating exemplary steps for integrated motion compensated noise reduction and motion compensated frame rate conversion, in accordance with an embodiment of the invention.

FIG. 6 is a flow chart illustrating exemplary steps for integrated motion compensated noise reduction and motion compensated frame rate conversion, in accordance with an embodiment of the invention. Step 601 is the beginning of exemplary steps. In step 603, a sequence of noisy original video frames, for example, r(n−1) 503 and r(n) 505 may be received by an integrated motion compensated noise reduction and motion compensated frame rate conversion system 300. In step 605, motion estimation may be performed by the ME module 305 on successive frames that may be noisy and/or noise reduced. For example, motion estimation may be performed utilizing a noisy previous frame r(n−1) 503 and a noisy current frame r(n) 505 or, for example, utilizing the noise reduced previous frame nr(n−1) 403 and the noisy original r(n) 405. Motion vectors may be determined by the ME module 305 that may be utilized for noise reduction and/or for frame rate conversion. In step 607, the determined motion vectors may be utilized to perform motion compensated noise reduction by the motion compensation (MC) module 313 and the TNR alpha blender 317. The TNR alpha blender 317 may output noise reduced original frames, for example, nr(n) 405 and/or nr(n) 505. In addition, the determined motion vectors may be utilized to perform motion compensated frame rate conversion by the MC-FRC 321 based on noise reduced original video frames, noisy original video frames and/or a combination of noisy and noise reduced original video frames. For example, the motion compensated frame rate conversion may be based on the frames nr(n−1) 403 and nr(n) 407, based on the frames nr(n−1) 403 and r(n) 405 and/or based on the frames r(n−1) 503 and/or nr(n) 507. In this regard, the MC-FRC 321 may generate new video frames, for example, p(n−0.5) 409 and/or p(n−0.5) 509. In step 609, the integrated motion compensated noise reduction and motion compensated frame rate conversion system 300 may output a sequence of video frames comprising noise reduced original frames and inserted generated new frames, for example, nr(n−1) 403, p(n−0.5) 409 and nr(n) 407. Step 611, is the end of exemplary steps.

In an embodiment of the invention, a video processing system 300 may receive a current raw video frame r(n) 405, for example, and may estimate motion between the current raw video frame r(n) 405 and a previous video frame, for example, rn(n−1) 403 to determine motion vectors. Noise reduction may be performed by the TNR alpha blender 317, for example, on the current raw video frame r(n) 405 based on the determined motion vectors. Furthermore, frame rate conversion, by the MC-FRC 321, for example, that may generate one or more inserted video frames, p(n−0.5) 409 between the current noise reduced video frame r(n) 405 and the previous video frame nr(n−1) 403, for example, may be determined based on the determined motion vectors. In this regard, the previous video frame may be noise reduced, for example, the frame nr(n−1) 403 may be utilized and/or may be a raw video frame, for example, the frame r(n−1) 503.

A motion compensated video frame, for example, mc(n) may be generated based on the previous video frame, for example, nr(n−1) 403 and the determined motion vectors. A current noise reduced video frame nr(n) 407 may be produced by blending the current raw video frame r(n) 405 with the motion compensated video frame mc(n). A blending factor a for the blending may be determined based on a level of similarity between pixels of the current raw video frame r(n) 405 and motion compensated pixels of the previous video frame, for example, nr(n−1) 403.

The motion vectors may be scaled for performing the frame rate conversion, for example, scaled based on a temporal distance between the current noise reduced video frame nr(n) 407 and the one or more inserted video frames p(n−0.5) 409.

In an exemplary embodiment of the invention, noise reduction on the current raw video frame r(n) 505, for example, may be performed in parallel with frame rate conversion in instances when one or more inserted video frames p(n−0.5) 509 are generated based on the current raw video frame r(n) 505 and the raw previous video frame r(n−1) 503. In another exemplary embodiment of the invention, noise reduction on the current raw video frame r(n) 405 may be performed in parallel with the frame rate conversion in instances when one or more inserted video frames p(n−0.5) 409 are generated based on the current raw video frame r(n) 405 and a noise reduced the previous video frame nr(n−1) 403. Furthermore, noise reduction on the current raw video frame r(n) 405 may be performed prior to performing frame rate conversion that may generate one or more inserted video frames p(n−0.5) 409 for example, based on the current noise reduced video frame r(n) 405 and a noise reduced the previous video frame nr(n−1) 403.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for integrated motion compensated noise reduction and frame rate conversion.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
performing by one or more processors, one or more, circuits, or any combination thereof:
  receiving a current raw video frame;
  estimating motion between said current raw video frame and a previous noise reduced video frame, wherein said noise reduced video frame is generated from a noise reduction module;
  determining motion vectors based on said current raw video frame and said previous noise reduced video frame;
  performing noise reduction on said current raw video frame, by said noise reduction module, based on said determined motion vectors, wherein said determined motion vectors are applied to said previous noise reduced video frame to create a current noise reduced video frame; and
  performing frame rate conversion, by a frame rate conversion module, that generates one or more inserted noise reduced video frames between said current noise reduced video frame and said previous noise reduced video frame based on said determined motion vectors shared with said noise reduction module,
wherein said noise reduction on said current raw video frame is performed prior to said frame rate conversion that generates said one or more inserted noise reduced video frames.

2. The method according to claim 1 comprising generating a motion compensated video frame based on said previous noise reduced video frame and said determined motion vectors.

3. The method according to claim 2 comprising, blending said current raw video frame with said motion compensated video frame to produce said current noise reduced video frame.

4. The method according to claim 3 comprising, determining a blending factor for said blending based on a level of similarity between pixels of said current raw video frame and motion compensated pixels of said previous noise reduced video frame.

5. The method according to claim 1 comprising, scaling said motion vectors for said performing frame rate conversion based on a temporal distance between said current noise reduced video frame and said one or more inserted noise reduced video frames.

6. A system for processing video, the system comprising:
one or more processors, one or more circuits, or any combination thereof that are operable to:
  receive a current raw video frame;
  estimate motion between said current raw video frame and a previous noise reduced video frame, wherein said noise reduced video frame is generated from a noise reduction module;
  determine motion vectors based on said current raw video frame and said previous noise reduced video frame;
  perform noise reduction on said current raw video frame, by said noise reduction module, based on said determined motion vectors, wherein said determined motion vectors are applied to said previous noise reduced video frame to create a current noise reduced video frame; and
  perform frame rate conversion, by a frame rate conversion module, that generates one or more inserted noise reduced video frames between said current noise reduced video frame and said previous noise reduced video frame based on said determined motion vectors shared with said noise reduction module,
wherein said noise reduction on said current raw video frame is performed prior to said frame rate conversion that generates said one or more inserted noise reduced video frames.

7. The system according to claim 6 wherein said one or more circuits are operable to generate a motion compensated video frame based on said previous noise reduced video frame and said determined motion vectors.

8. The system according to claim 7 wherein said one or more circuits are operable to blend said current raw video frame with said motion compensated video frame to produce said current noise reduced video frame.

9. The system according to claim 8 wherein said one or more circuits are operable to determine a blending factor for said blending based on a level of similarity between pixels of said current raw video frame and motion compensated pixels of said previous noise reduced video frame.

10. The system according to claim 6 wherein said one or more circuits are operable to scale said motion vectors for said performing frame rate conversion based on a temporal distance between said current raw video frame and said one or more inserted noise reduced video frames.

11. The method according to claim 1, further comprising outputting said previous noise reduced video frame from a frame buffer to said noise reduction module and said frame rate conversion module.

12. The method according to claim 1, further comprising communicating said determined motion vectors to said noise reduction module and said frame rate conversion module.

13. The method according to claim 1, further comprising outputting said previous noise reduced video frame from a frame buffer to said noise reduction module and said frame rate conversion module.

14. The method according to claim 1, further comprising outputting a video sequence of frames comprising said previous noise reduced video frame, said inserted noise reduced video frames, and said current noise reduced video frame.

15. The system according to claim 6, further comprising a frame buffer operable to output said previous noise reduced video frame to said noise reduction module and said frame rate conversion module.

16. The system according to claim 6, further one or circuits, or any combination operable to communicate said determined motion vectors to said noise reduction module and said frame rate conversion module.

17. A method for processing video, the method comprising:
performing by one or more processors, one or more, circuits, or any combination thereof:
receiving a current raw video frame;
estimating motion between said current raw video frame and a previous noise reduced video frame, wherein said noise reduced video frame is generated from a noise reduction module;
determining motion vectors based on said current raw video frame and said previous noise reduced video frame;
performing noise reduction on said current raw video frame, by said noise reduction module, based on said determined motion vectors, wherein said determined motion vectors are applied to said previous noise reduced video frame to create a current noise reduced video frame; and
performing frame rate conversion, by a frame rate conversion module, that generates one or more inserted noise reduced video frames between said current video frame and said previous noise reduced video frame based on said determined motion vectors shared with said noise reduction module.

18. The method according to claim 17, wherein said noise reduction on said current raw video frame is performed in parallel with said frame rate conversion that generates one or more inserted noise reduced video frames.

19. The method according to claim 18, further comprising outputting in parallel said current noise reduced frame and said inserted noise reduced frames.

20. The method according to claim 17, further comprising communicating said determined motion vectors to said noise reduction module and said frame rate conversion module.

* * * * *